May 8, 1928.
C. E. MAYNARD
1,669,260
METHOD OF TUBE MANUFACTURE
Filed May 27, 1926
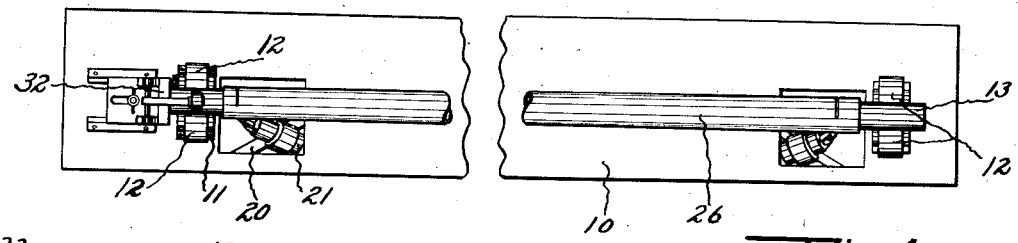
Fig. 1.
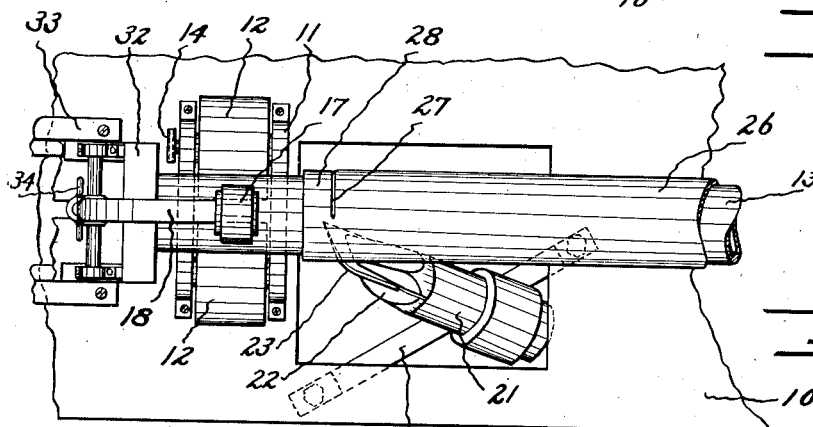
Fig. 2.
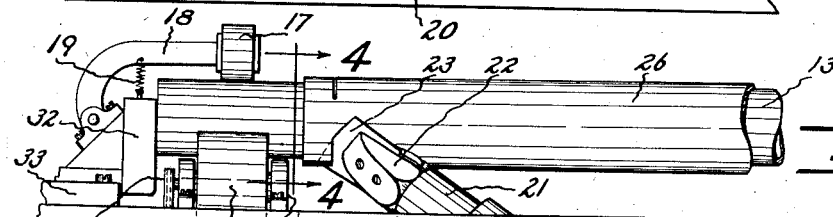
Fig. 3.
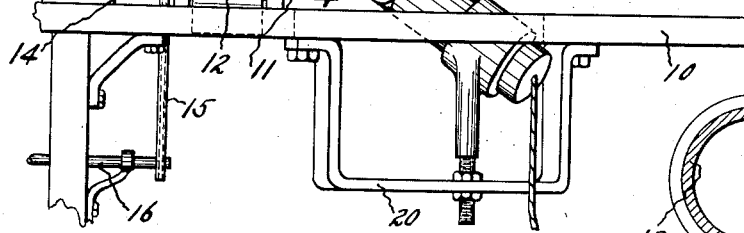
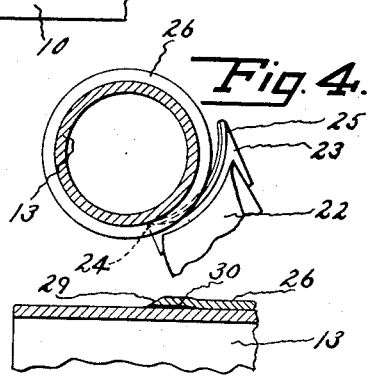
Fig. 4.
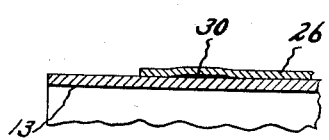
Fig. 5.
Fig. 6.
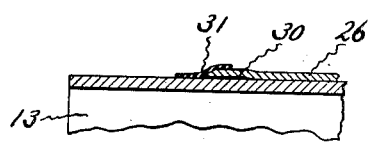
Fig. 7.
INVENTOR.
Charles Edgar Maynard
BY
Edward C. Taylor
ATTORNEY.

Patented May 8, 1928.

1,669,260

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF TUBE MANUFACTURE.

Application filed May 27, 1926. Serial No. 111,968.

This invention relates to the production of rubber tubes such as inner tubes for automobile tires. It has for one object the simultaneous trimming to length and skiving of the ends of the tube prior to vulcanization. It has for another object the elimination of all cutting of trimmings or scrap from the tube after vulcanization. It has for another object the improvement in the manner in which the tube is sealed to the mandrel in preparation for vulcanization with its surface in direct contact with a heated fluid such as steam. It has other and further objects which will appear from the following description and claims.

Referring to the drawings,

Fig. 1 is a plan view of a trimming and skiving table upon which my invention may be practiced;

Fig. 2 is an enlarged top plan view of a portion thereof;

Fig. 3 is a side elevation of the portion of the device shown in Fig. 2;

Fig. 4 is a section on line 4—4 of Fig. 3,

Fig. 5 is a sectional detail of a rubber tube prepared for vulcanization and ready for the skiving and trimming operation;

Fig. 6 is a similar view illustrating the completion of the skiving and trimming operation; and Fig. 7 is a similar view illustrating a modified way of preparing the tube for vulcanization.

In the manufacture of inner tubes for automobile tires it has been customary to vulcanize the tube upon a mandrel, remove it from the mandrel, skive the ends and join the tube into annular form. The purpose of the skive is to facilitate the splicing of the ends and to avoid sudden changes in thickness in the wall of the completed tube. Originally this skiving was done upon specially designed cutting machines into which the ends of the vulcanized tubes were inserted after removal from the mandrel. More lately it has been proposed to make the skive during vulcanization by some species of clamp or cuff which molded the end of the tube against the mandrel as the tube was being cured, as in my Patent No. 1,391,784 granted Sept. 27, 1921 and in the patent to Little No. 1,450,320 granted Apr. 3, 1923. Either of these methods necessitates the length of the tube being initially greater than that ultimately desired, with a consequent trimming of the tube after it has been vulcanized. The trimming or scrap thus produced, being of vulcanized rubber and therefore being incapable of re-use without undergoing a reclaiming or desulphurizing process, is worth less to a rubber manufacturer than the same amount of scrap in unvulcanized form. Further proposals have therefore been made, by which the tube was skived by clamps or cuffs left on during vulcanization and the tube trimmed to length prior to vulcanization either by the cuffs themselves or by a knife.

These prior proposals have all been objectionable for one reason or another, because of extra operations involved, the production of cured scrap, or the expense and labor incident upon the use of clamps or cuffs. By my invention I am enabled to avoid these awkward and expensive prior methods, and to cut the tubes to length and skive them at one operation without the use of clamps or cuffs during vulcanization. In another aspect of my invention I prepare the tubes for vulcanization in a better manner than has hitherto been done, avoiding the use of expensive equipment during vulcanization and effectively preventing the formation of blemished or defective tubes by the entrance of the vulcanizing fluid between the tube and the mandrel.

Stated rather briefly, my invention comprises in one aspect trimming the end of the tube, while still uncured and mounted on the mandrel, by a knife shaped and mounted so as to cut upon a bevel, thus skiving the tube and cutting it to length in one operation. In another aspect my invention comprises skiving the tube around a circumference where a layer of adhesive rubber has been placed between the tube and the mandrel, thereby forming a tight seal up to the very edge of the skive without the necessity for using any external confining means such as clamps or cuffs. In still another aspect of my invention I supplement the sealing action of the cement by a thin and therefore inexpensive band of elastic rubber, which may be of insufficient strength to do the actual skiving.

In the drawings I have shown a device by which the method described above may be practiced. Upon a table 10 are secured journals 11 for spaced pairs of rolls 12, these rolls serving to support rotatably a tube mandrel 13. Preferably one of these rolls carries a sprocket 14 connected by a chain 15 to a sprocket on a power shaft 16. Of course other means of rotating the rolls may be used, or the rolls may be free and the mandrel rotated upon them by hand. In case the mandrel is to be rotated by the rolls, it is preferably held against them by a roll 17 carried as on a swinging arm 18 and pressed against the mandrel by a spring 19. Driving means have been shown at one end only of the mandrel, but if desired it may be rotated from both ends.

Mounted upon a bracket 20 at each end of the table is an electric heating element 21 of any usual type, such for example as is employed in electrically heated soldering irons. A heavy metal heat conducting body 22 projects from this heating element and is split to receive a cutting blade 23. This blade is preferably formed of some metal such as bronze which combines the features of high heat conductivity and wearing qualities. The cutting edge of the blade is shaped so that at one end 24 it comes in contact with the mandrel while the other end 25 is spaced a short distance away. Intermediate these points the blade is curved both away from the mandrel surface and longitudinally of the mandrel, so that the cut made will be along a taper. As the mandrel revolves, the rubber tube 26 upon it is drawn past the knife which is preferably heated to a temperature sufficient to soften the rubber and facilitate the cutting. The tube is thus simultaneously cut and skived along the line 27, the trimmed end 28 being now removable, leaving the end of the tube beveled off as at 29 in Fig. 6.

As stated before, it is one object of my invention to improve the sealing of the tube to the mandrel. This is of importance in methods of tube vulcanization in which the tube is exposed to the action of a heated fluid such as steam. In this connection I make use of, and in certain aspects improve upon, the disclosure in my copending application Serial No. 102,458, filed April 16, 1926, in which a band of cement or other adhesive rubber is applied between the tube and the mandrel. This band of rubber is indicated in the present drawings at 30. Preferably the skive is made so that it passes through the cement, the combination of the heat of the knife, the drawing or shearing nature of the cut and the pressure with which the knife is forced against the mandrel making a perfect seal at this point and insuring that the tube will be stuck securely to the cement. As a further safeguard I may place over the end of the tube a short band of vulcanized rubber 31 (Fig. 1), conveniently cut from a tube of smaller diameter than that of the mandrel 13. The band 31 need not be heavy enough to exert any skiving or sealing pressure of its own, serving merely to prevent any accidental curling or displacement of the thin edge of the tube 26 during the cure.

By using one of these cutting and skiving units on each end of the mandrel, the tube will be trimmed accurately to length and both ends beveled off as a single operation. In order to align the mandrel accurately with the cutting devices, I preferably provide at one end a stop 32 against which the end of the mandrel abuts. Adjustability of the stop to accommodate different sizes of tubes can be secured by making it slidable in guides 33, with a thumb screw 34 for holding it in adjusted position.

The mechanical structure here shown is illustrative only, changes in design being contemplated within wide limits. The scope of the invention, in its aspects both as a method and as a machine, is pointed out in the appended claims.

Having thus described my invention, I claim:

1. A method of making a rubber tube which comprises beveling the end of the tube with an edged tool while the rubber is as yet uncured, and subsequently vulcanizing the rubber.

2. A method of making a rubber tube which comprises forming a piece of tubular stock with open ends, interiorly supporting the tube adjacent its end, beveling the end of the tube with an edged tool, and subsequently vulcanizing the rubber.

3. A method of making a rubber tube which comprises mounting a length of tubular stock upon a mandrel, beveling at least one end of the tube by severing the uncured rubber with an edged tool acting against the mandrel, sealing the ends of the tube to the mandrel, and subjecting the tube to vulcanization.

4. A method of making a rubber tube which comprises mounting the tube on a mandrel with a film of adhesive rubber between the tube and mandrel at each end, trimming the tube to length by a shearing cut passing through the tube and rubber film at each end, whereby the tube is tightly sealed to the mandrel, and subjecting the tube to vulcanization in an atmosphere of heated fluid.

5. A method of making a rubber tube which comprises mounting the tube on a mandrel with a film of adhesive rubber between the tube and mandrel at each end, beveling the ends of the tube and simultaneously trimming the tube to length by a shearing cut passing through the tube and rubber film at each end, whereby the tube is tightly sealed to the mandrel, and subjecting the tube to vulcanization in a heated fluid in the absence of external rigid confining means.

6. A method of vulcanizing a rubber tube which comprises mounting the tube upon a mandrel and rotating the tube in contact with a heated cutter curved around the mandrel and tube to produce a skiving cut.

7. A method of vulcanizing a rubber tube which comprises mounting the tube upon a mandrel with a film of adhesive rubber between the tube and the mandrel at each end, cutting the tube on a bevel at each end, the cut passing through the film of adhesive rubber, binding the ends of the tube to the mandrel by an elastic band, and subjecting the tube to a vulcanizing heat.

CHARLES EDGAR MAYNARD.